United States Patent [19]

Kefalas et al.

[11] 3,725,882

[45] Apr. 3, 1973

[54] MEMORY ELEMENT AND CONFIGURATION

[75] Inventors: John H. Kefalas, North Billerica; Roman E. Lukianov, Framingham, both of Mass.

[73] Assignee: Honeywell Inc., Minneapolis, Minn.

[22] Filed: Dec. 18, 1969

[21] Appl. No.: 886,273

[52] U.S. Cl....340/174 M, 340/174 DC, 340/174 JA

[51] Int. Cl....G11c 5/04, G11c 11/06

[58] Field of Search....340/174 M, 174 DC, 174 MA, 340/174 JA

[56] References Cited

UNITED STATES PATENTS

| | | | |
|---|---|---|---|
| 3,316,541 | 4/1967 | Fischer | 340/174 M |
| 3,183,567 | 5/1965 | Riseman et al | 340/174 JA |
| 3,276,000 | 9/1966 | Davis | 340/174 |
| 3,130,134 | 4/1964 | Jones | 340/174 X |
| 3,317,408 | 5/1967 | Barnes et al. | 340/174 X |

FOREIGN PATENTS OR APPLICATIONS

| | | | |
|---|---|---|---|
| 951,806 | 3/1964 | Great Britain | 340/174 M |

*Primary Examiner*—Stanley M. Urynowicz, Jr.
*Attorney*—Fred Jacob and Ronald T. Reiling

[57] ABSTRACT

A data storage device has a number of mutually separate, closed-flux-path magnetic elements arranged within a plane in an array of columns and rows. Each of a first set of conductors surrounds a respective column of magnetic elements and is magnetically linked therewith. Corresponding to each row of elements is a conductor of a second set of conductors which threads through the magnetic elements of its respective row.

8 Claims, 6 Drawing Figures

INVENTORS
JOHN H. KEFALAS
ROMAN E. LUKIANOV
BY
Leo Stanger
ATTORNEY

INVENTORS
JOHN H. KEFALAS
ROMAN E. LUKIANOV
BY Leo Stanger
ATTORNEY

MEMORY ELEMENT AND CONFIGURATION

BACKGROUND

This invention relates to a data storage device for computers or the like and a method for making it, and more particularly to a memory device and method for making it which utilizes magnetic elements for storage of information.

In the development of computer technology increasing attention has been given to the data storage unit of the computer. Demands for the improvement of the computer have resulted in a concern for larger storage capacities, faster memories, and a higher order of reliability of operation. Experience has shown that to improve memory devices in these respects serves to improve the overall operation of the computer accordingly.

Plated wire memories, for example, have been and are undergoing development in order to satisfy these demands. The basic structure of a plated wire memory element consists of a length of wire coated with a film of magnetic material. The magnetic film is deposited on the cylindrical surface of the wire in a continuous electro-plating process. A single memory element, storing one bit, is perhaps fifty mils in length. Several hundred bits can conveniently be stored on each of the many wires making up the memory. Bit positions are determined at the position of intersection of word lines, transverse to and isolated from the plated wires, with the plated wires themselves.

The advantages of a plated wire memory have long been apparent. The most significant advantage has been the non-destructive read-out of stored data combined with the ability to write in data electronically and at high speeds. This approach, while allowing for cheaper and faster main memories, does have, inherent to its configuration, problems concerning packaging and signal output. The field generated from any given word line necessarily extends to bits adjacent that word line. This phenomenon results in interference and creep between adjacent bits within the memory plane.

It is thus an object of the present invention to provide a data storage device which alleviates the above problems of interference and creep.

It is a further object of the present invention to provide a data storage device which utilizes magnetic elements for storage of information.

It is yet another object of the present invention to provide a data storage device which provides for non-destructive read-out of stored data and has the ability to write new data electronically and at high speeds.

It is still another object of the present invention to provide a data storage device which lends itself to wide application, high performance, and low cost.

It is also an object of the present invention to provide a method of fabrication of a data storage device which insures ease and low cost of manufacture, efficiency of memory packaging, a high density of bit storage, a compact and strong storage device.

Other objects of the invention will be evident from the description hereinafter presented.

SUMMARY OF THE INVENTION

The invention provides a memory plane in which mutually-separated closed-flux-path magnetic elements are arranged in a matrix formation of columns and rows within a plane. Each of these elements locates one bit of memory storage. These magnetic elements may, for example, comprise the portions of magnetic material which cover the cylindrical surfaces formed by boring a matrix of holes through the top and bottom surfaces of a non-conductive substrate. Each conductor of a plurality of first conductors surrounds a corresponding column of magnetic elements. With each column defining a word of data storage, such first conductors act as word straps or word lines when a current is applied thereto. Each conductor of a plurality of second conductors, isolated from the first set of conductors, is associated with the magnetic elements of a corresponding row. These conductors are threaded through or past the magnetic elements in their respective rows so that a magnetic flux may be induced within each element in a given row in the circumferential direction when a current is applied to the conductor corresponding to that row. With each row defining a group of storage digits, such second conductors act as digit lines.

When current is applied to the first set of conductors, the field emanating from the portion of a first conductor on one side of its respective column of elements reinforces, within the area defined by the looping conductor, the field generated from the portion of the same conductor on the other side of the same column. Outside the boundary defined by the portions of the conductor, the fields effectively cancel one another. Since the field when generated from a given word line does not effectively extend to magnetic elements located in adjacent columns, the primary source of interference and creep between adjacent bits in plated-wire memories is essentially eliminated.

The invention also provides a method for manufacturing the above described memory plane. Holes, forming an array of columns and rows, are bored through a plane of non-conductive material. A layer of magnetic material is plated at least on the cylindrical surfaces, defining the holes, within the plane. Conductive strips are plated on the opposite surfaces of the plane so that at least each surrounds a corresponding column of plated cylindrical surfaces. The conductive strips are coated with a layer of insulation. Finally, a plurality of second conductors are provided so that each may thread the plated cylindrical surfaces in a corresponding row.

These and other features which are considered to be characteristic of this invention are set forth with particularity in the appended claims. The invention itself, however, as well as additional objects and advantages thereof, will best be understood from the following description when considered in conjunction with the accompanying drawings.

DESCRIPTION OF THE PREFERRED EMBODIMENT

Figure 1:
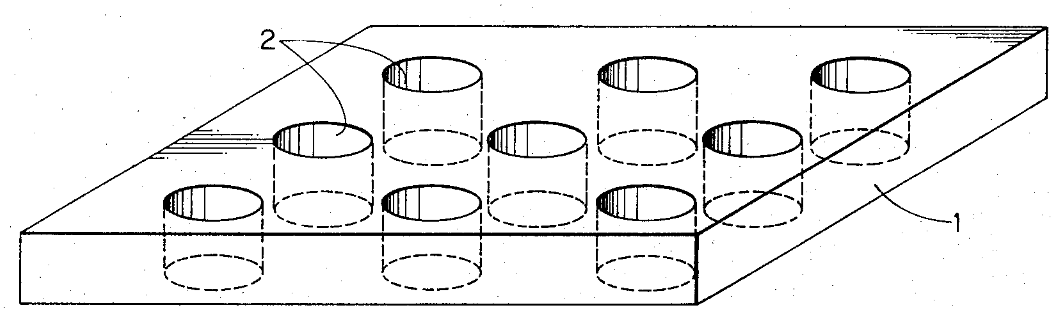
FIG. 1 is a perspective view of a non-conductive substrate which serves as the basic memory structure and embodies features of the invention.

The basic memory structure or substrate 1, of the device according to invention, in FIG. 1 has a matrix of holes or bores through its top and bottom surfaces arranged in columns and rows. Such holes and bores from cylindrical surfaces 2 within the memory substrate 1. The memory substrate is of a non-conductive substance. For example, printed circuit board material would be suitable as a substrate.

Figure 2:
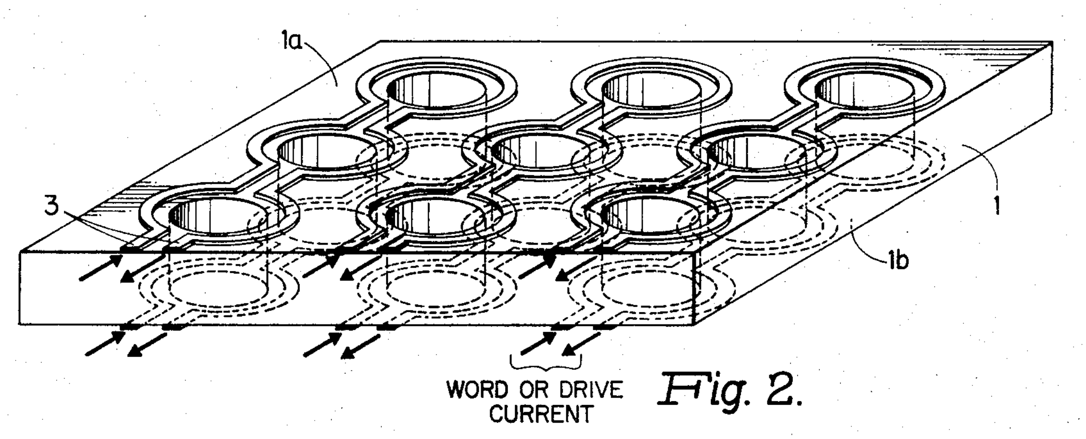
FIG. 2 is a perspective view of the substrate upon which a first set of conductors has been placed.

In FIG. 2, a pair of conductive strips 3 are disposed on the top and bottom surfaces 1*a* and 1*b*, respectively, of the substrate 1, each strip on a respective surface surrounding a corresponding column of holes by extending on one side of a given column of holes and returning on the opposite side of the same hole. Thus, a pair of conductive strips 3 nearly circularly surround each column of holes. In this preferred embodiment, the strips are disposed by first plating on the upper and lower surfaces 1*a* and 1*b* of the substrate a layer of conductive material and then etching from the conductive layer strips 3 to conform to the desired paths looping around the columns of holes. These conductive strips 3 serve as word lines for reading or writing data in the completed memory plane 10 when a current is applied thereto.

Figure 3:
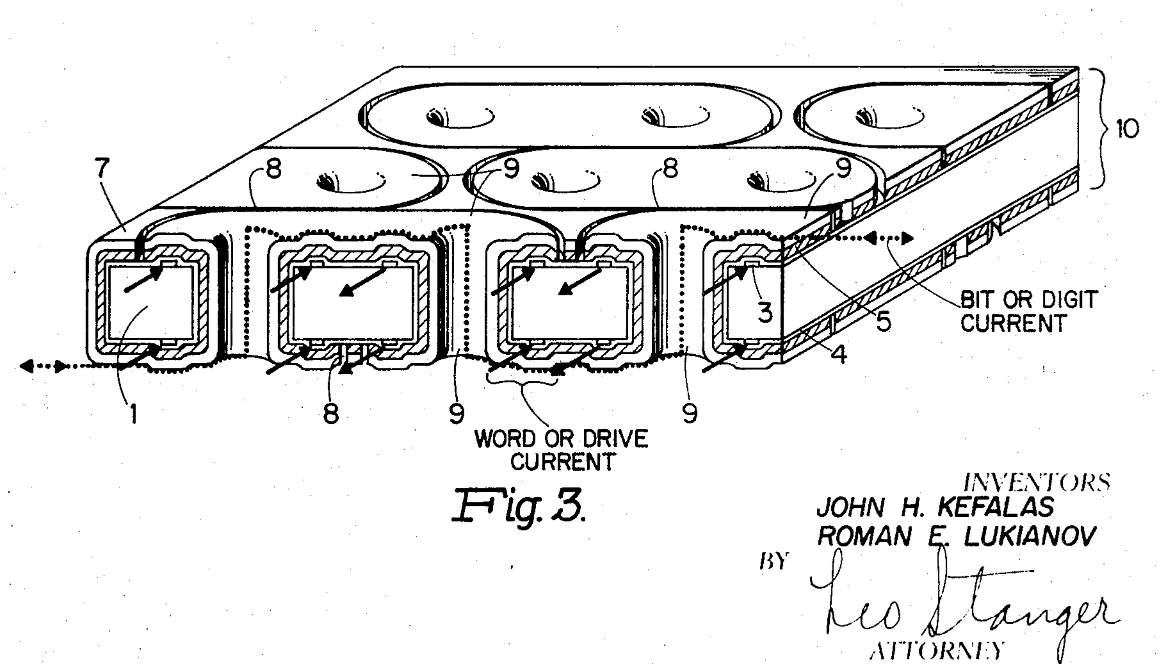
FIG. 3 is a perspective view of a cross section of the completed memory plane embodying features of the invention.
Figure 4:
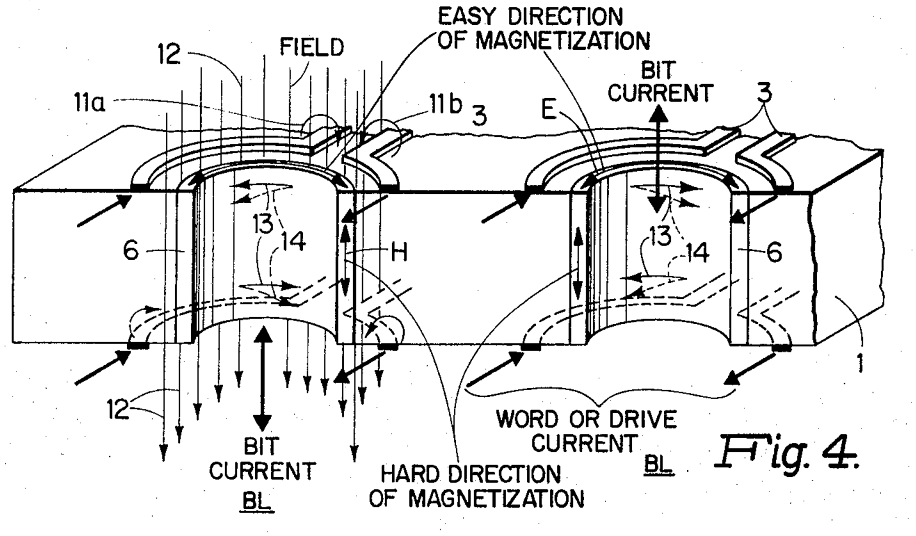
FIG. 4 is a cross sectional view of the memory plane showing the distribution of currents, magnetic fields, and the resulting stored magnetization vectors in the memory plane of FIG. 3.

An insulation layer 4, shown in FIG. 3, covers the conductive strips 3 and the entire memory substrate 1. The insulation layer, however, need only coat the conductive strips 3. A layer of magnetic material 5 covers this insulation layer 4, including the cylindrical surfaces 2 within the memory substrate 1. The portion of the magnetic material 5 encompassed by each cylindrical surface 2 within the memory substrate 1 defines the magnetic element 6 of each bit location BL shown in FIG. 4. Such portions of the magnetic material 5 may be thought of as cylinders of magnetic materials and are characterized by easy and hard directions of magnetization. These directions may be induced during the deposition of the layer of magnetic material 5 by an external field so as to effectuate an anisotropy in the magnetic layer within the holes in either the axial or circumferential direction, the hard or easy direction of the magnetic material being dependent on the direction of the anisotropy of the magnetic material itself. As shown in FIG. 4, the easy direction E is in the circumferential direction, with respect to the cylindrical surface 2, and the hard direction H is longitudinal to the cylindrical surface.

Figure 5:
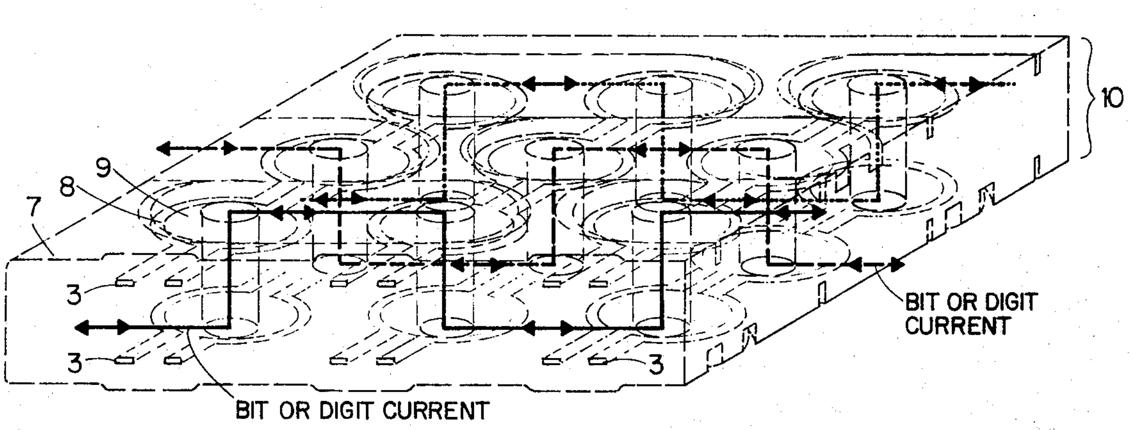
FIG. 5 is a perspective view indicating the conductive paths etched through and connecting memory elements within each row of the memory plane in FIG. 3.

As further shown in FIG. 3 a second conductive layer 7 is plated over the layer of magnetic material 5. Troughs 8 are etched through the conductive layer 7 through the layer of magnetic material 5 to the insulation layer 4 such that a conductor 9 for a given row of magnetic elements 6 or cylindrical surfaces 2, defining each bit location BL, passes back and forth, i.e., shuttlewise, from one surface, e.g. 1a, of the substrate to the other surface, e.g. 1*b*, through each bit location BL of the row. The portions of the conductive layer 7 on the surfaces 2 within the holes form cylindrical conductors which can carry current through the holes. In FIG. 5, such second conductive paths act as digit lines for writing data in the memory plane 10 when a current is applied thereto.

As shown in FIG. 4, a current through one of the conductive strips 3 results in a current in one direction in for one portion of the strip and a current in the opposite direction for the adjacent return portion of the same strip. This current flow establishes fields 11*a* and 11*b*, respectively emanating from the adjacent portions of each strip. The fields 11*a* and 11*b* combine to form a resultant field 12 between them in a direction parallel to the axes of the holes, or cylindrical surfaces within the holes. A field is thereby induced in the magnetic element 6 located on the inner surface of the hole in the axial direction.

A second current, the digit current, if introduced to a given "row" conductor, travels through the conductor 9 within its respective row and thereby establishes a magnetic field in each of the magnetic elements 6 within that row in a direction circumferential to the axes of said magnetic elements. Reading and writing is controlled by means of a selection of currents through the conducting strips (or word lines) and the plurality of second conductors (or digit lines).

To write data into any given bit within the memory, the two currents which would couple the above two fields at that bit location are applied co-incidentally to develop the resultant magnetization vector necessary to store a one or a zero. The direction of the digit current, e.g., the current through the digit line (or second conductor), determines whether the bit stored is a one or a zero. It forms a magnetization vector such as 13 in one or the other circumferential direction.

To read stored information from any given bit location, a current need only be applied to the respective word line (or first conductor). As shown in FIG. 4, this induces a longitudinal component of magnetization within the magnetic element 6 in the axial direction, which tilts the magnetization vector 13 from its rest position in the easy direction E toward the hard axis H of magnetization as shown by arrow 14. Such magnetic flux generates a pulse in the respective digit line (or second conductor) which in turn may be read by a sense amplifier connected to it. At the termination of the current pulse, the vector 13 returns to its original position. Hence, the process of reading out does not destroy the stored information within a given bit location.

Figure 6:
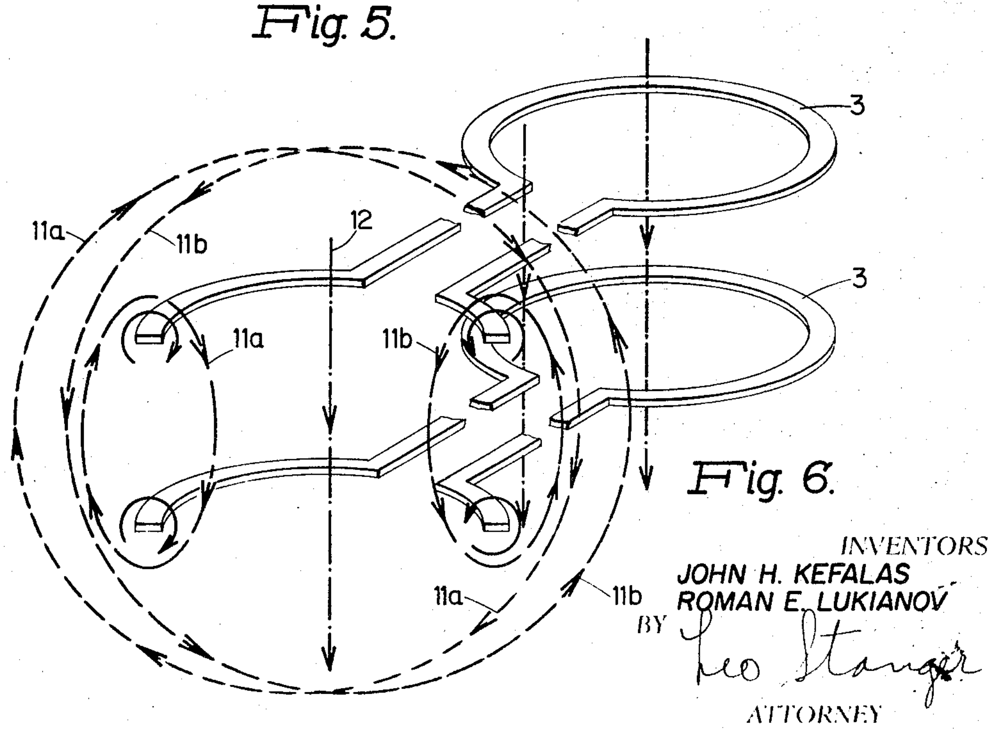
FIG. 6 is a view of the magnetic fields generated from a pair of conductive strips on the memory plane of FIG. 3.

The configuration, so defined, has the advantage of wire memories in its switching capacity, but has additional beneficial characteristics as well. This configuration also allows for a reduction in interference. As shown in FIG. 6, the fields 11*a* and 11*b* emanating from the conductive strips 3 reinforce each other to form resultant field 12. These are localized within bounds defined by the configuration of the conductive strips 3 which, serve as word lines for their respective memory elements 6. Outside the boundries of conductive strips 3 the fields 11*a* and 11*b* generated from the opposite segments of each conductive strip, on each side of a given column of holes, extend in opposite directions. Thus, the fields effectively cancel one another, having then no effect upon adjacent bits. Therefore, a chief source of interference between adjacent columns of bits is eliminated. Since the reduction of interference is achieved simply by the configuration of conductive strips a much higher density of packaging than that known to the prior art may be attained. Moreover, the configuration of closed-flux-path magnetic elements results in the elimination of creep between storage locations. Furthermore, the total configuration lends itself to an easy and low cost fabrication.

One method employed for the manufacture of a suitable memory plane of this type is to bore holes through a plane or sheet 1 of non-conductive material, such that cylindrical surfaces 2 are formed in the sheet and aligned in a matrix formation of columns and rows. Magnetic material 5 is electrolytically or electrolessly deposited uniformly upon these cylindrical surfaces 2. During the deposition, an external magnetic field is applied to insure an anisotropy in the deposited layer of magnetic material in the circumferential direction. Next, a first conductive layer is plated on the top and bottom surfaces of the sheet 1 of non-conductive material; each surface is then etched to form conductive strips 3, which nearly surround a corresponding column of cylindrical surfaces 2. The conducting strips 3 are then coated with an insulation layer 4 to provide for the plating of a second conductive layer 7 over the surfaces of the plane, as now completed, including the magnetically plated cylindrical surfaces 2 within the plane. Finally, a pattern of conductive paths in the conductive layer 7 is etched on both sides of the plane to provide a conductive winding 9 connecting and within each of the cylindrical surfaces 2 for each row. While these conductive paths may serve as sense windings as well as digit lines, it may be desirable to deposit a second layer of insulation and a third etched conductive layer in the same manner as described above to provide for a separate sense winding.

Obviously, many modifications of the present invention are possible in the light of the above teaching. It is therefore to be understood that, in the scope of the appended claims, the invention may be practiced otherwise than as specifically described.

What is claimed is:

1. A data storage device comprising:

a plane of non-conductive material having embedded therein a plurality of hollow cylinders of magnetic material spaced from one another in a matrix formation of columns and rows;

the axes of said cylinders being substantially perpendicular to the surfaces of said plane;

a plurality of first conductors comprising conductive strips plated on both surfaces of said plane, each of which loops around a corresponding column of cylinders upon its respective surface and is closely spaced from each cylinder of its respective column;

said first conductors generating magnetic flux only within an area bounded by the loops of said first conductors, said hollow cylinder being within said area, said magnetic flux outside said bounded area being effectively cancelled; and, a plurality of second conductors insulated from said first conductors, each of which passes through the cylinders in its corresponding row aligned along the axes of its respective cylinders.

2. A device as claimed in claim 1 wherein said plurality of first conductors provide a magnetic flux in said circumferential direction of said magnetic elements, and said plurality of second conductors provide a magnetic flux in said axial direction of said magnetic elements.

3. A device as claimed in claim 2 wherein information is randomly stored in any one magnetic element by the selective coincident coupling of magnetic flux provided by said first and said second conductors, and information is randomly read out of said magnetic material by said magnetic flux provided by said first conductor and sensed by said second conductor.

4. A data storage device comprising in combination:

a plane of nonconductive material having an array of apertures arranged in a matrix formation of columns and rows;

a plurality of magnetic elements arranged within said array of apertures, each of said magnetic elements defined by said array of apertures and having axial and circumferential dimensions;

the axes of said elements being substantially perpendicular to the surfaces of said plane;

a plurality of pairs of first conductors associated with said columns of magnetic elements, each of said pairs of first conductors positioned around and in spaced relationship with said circumferential dimension of said magnetic elements so as to substantially circumscribe each axial end of said magnetic elements in one of said columns; and, a plurality of second conductors insulated from said first conductors and associated with said rows of said magnetic elements, each of said second conductors passing through one of said rows of said magnetic elements in said plane.

5. A device as claimed in claim 4 wherein said passing of said second conductor is back and forth from one surface of said plane to the other surface of said plane through each of said magnetic elements of said one row.

6. The device as claimed in claim 4 wherein the portions of said second conductors encompassed by said elements are aligned along and correspond to said axes.

7. The device as claimed in claim 6 wherein said circumferential dimension is much less than said axial dimension for each of said magnetic elements.

8. The device as claimed in claim 7 wherein one of said first conductors, around said one column of cylinders, is carried by one surface of the non-conductive plane and another of said first conductors, surrounding the same column of cylinders, is carried by the other surface of the plane.

* * * * *